United States Patent
Nishimura et al.

(10) Patent No.: US 9,638,881 B2
(45) Date of Patent: May 2, 2017

(54) APPARATUS HAVING HOUSING IN WHICH OPTICAL FIBER IS PROVIDED, SUPPORTING MEMBER, AND SUPPORTING METHOD

(71) Applicant: FUJIKURA LTD., Koto-ku, Tokyo (JP)

(72) Inventors: Akito Nishimura, Sakura (JP); Kenji Kohara, Sakura (JP)

(73) Assignee: FUJIKURA LTD., Tokyo (JP)

( * ) Notice: Subject to any disclaimer, the term of this patent is extended or adjusted under 35 U.S.C. 154(b) by 138 days.

(21) Appl. No.: 14/489,054

(22) Filed: Sep. 17, 2014

(65) Prior Publication Data

US 2015/0086164 A1 Mar. 26, 2015

(30) Foreign Application Priority Data

Sep. 24, 2013 (JP) ................ 2013-197393

(51) Int. Cl.
*G02B 6/36* (2006.01)
*G02B 6/44* (2006.01)
*G02B 6/42* (2006.01)

(52) U.S. Cl.
CPC .......... *G02B 6/4448* (2013.01); *G02B 6/4268* (2013.01)

(58) Field of Classification Search
None
See application file for complete search history.

(56) References Cited

FOREIGN PATENT DOCUMENTS

| JP | 2002-258067 A | 9/2002 |
| JP | 2003149453 A | 5/2003 |

OTHER PUBLICATIONS

Communication dated Jul. 28, 2015 from the Japanese Patent Office issued in corresponding Japanese application No. 2013-197393.
Communication dated Jun. 9, 2015, issued by the Japanese Patent Office in counterpart Application No. 2013-197393.

*Primary Examiner* — Chad Smith
(74) *Attorney, Agent, or Firm* — Sughrue Mion, PLLC

(57) ABSTRACT

According to an aspect of the apparatus of the present invention, wind generated by a cooling fan blows in a housing, and a port is optically connected with an optical module via an optical fiber. Further, a shielding wall is provided to an optical fiber arranging member, which supports and guides the optical fiber, so as to prevent the optical fiber from being exposed to the wind.

9 Claims, 7 Drawing Sheets

<A-A' CROSS SECTION>

APPARATUS HAVING HOUSING IN WHICH OPTICAL FIBER IS PROVIDED, SUPPORTING MEMBER, AND SUPPORTING METHOD

This Nonprovisional application claims priority under 35 U.S.C. §119 on Patent Application No. 2013-197393 filed in Japan on Sep. 24, 2013, the entire contents of which is hereby incorporated by reference.

TECHNICAL FIELD

The present invention relates to an apparatus which has a housing that contains an optical component and an optical fiber connected with the optical component.

BACKGROUND ART

Conventionally, a method is known in which an optical element, an optical circuit, an optical component, and the like, which are provided in an apparatus, are optically connected with optical fibers arranged in the apparatus.

Patent Literature 1 discloses a photoelectric composite device which carries out a process by linking an optical signal with an electric signal. In the photoelectric composite device, optical components provided in the device are optically connected to each other with the use of optical fibers that are arranged on and held by a flexible sheet substrate provided with an electromagnetic shielding layer. In Patent Literature 1, the optical fibers are provided between a plastic sheet material and a laminate material and are arranged and held in an arbitrary shape.

According to (i) an apparatus that includes a plurality of optical components in one (1) apparatus and (ii) an apparatus that includes an electrical component in addition to an optical component, such an apparatus also includes a heat radiating (cooling) mechanism for radiating heat of the components. For example, a heat radiating mechanism is known in which air is blown into a housing, in which optical components are provided, so that relatively strong wind blows in the housing.

CITATION LIST

Patent Literature

[Patent Literature 1]
Japanese Patent Application Publication Tokukai No. 2002-258067 (Publication date: Sep. 11, 2002)

SUMMARY OF INVENTION

Technical Problem

In a case where a plurality of optical fibers are arranged in an apparatus, a route of an optical fiber is sometimes changed in arranging the plurality of optical fibers. For example, as a result of the arrangement, it sometimes happens that improper tension is exerted on a particular optical fiber. In such a case, a route of the particular optical fiber or another optical fiber may be changed. However, in Patent Literature 1, a sheet substrate is used in which the optical fibers are provided between the sheet material and the laminate material. Therefore, in a case where a route of an optical fiber is changed (i.e., rearranged), an entire sheet wiring board including the sheet substrate needs to be replaced. Accordingly, working efficiency is lowered.

If the sheet material or the laminate material of the sheet wiring board of Patent Literature 1 is removed, it is easy to carry out the rearrangement because the optical fibers are exposed. However, in a case where the optical fibers are arranged while being exposed in the apparatus, the optical fibers flutter by wind for the above described heat radiation or the optical fibers are improperly deformed by wind pressure, and accordingly a property of the optical fibers may be deteriorated.

In view of the problem, the inventors of the present invention have accomplished the present invention by studying a wiring mechanism which can maintain a property of optical fiber even in a configuration in which the optical fiber is freely arranged.

That is, an object of the present invention is to provide an apparatus in which an optical fiber is arranged in a housing without being influenced by wind.

Solution to Problem

In order to attain the object, an apparatus of the present invention includes: a housing having a port to which an optical fiber is to be connected; a substrate on which an optical module is provided in the housing; an optical fiber via which the port is optically connected with the optical module; a feed opening via which wind is introduced into the housing; and a supporting member for supporting the optical fiber in the housing, the supporting member having a shielding wall which is provided windward of the optical fiber so as to block wind blowing toward the optical fiber.

Advantageous Effects of Invention

According to the present invention, it is possible to provide the apparatus in which an optical fiber is arranged in a housing without being influenced by wind.

DESCRIPTION OF EMBODIMENTS

Embodiment 1

Figure 1:
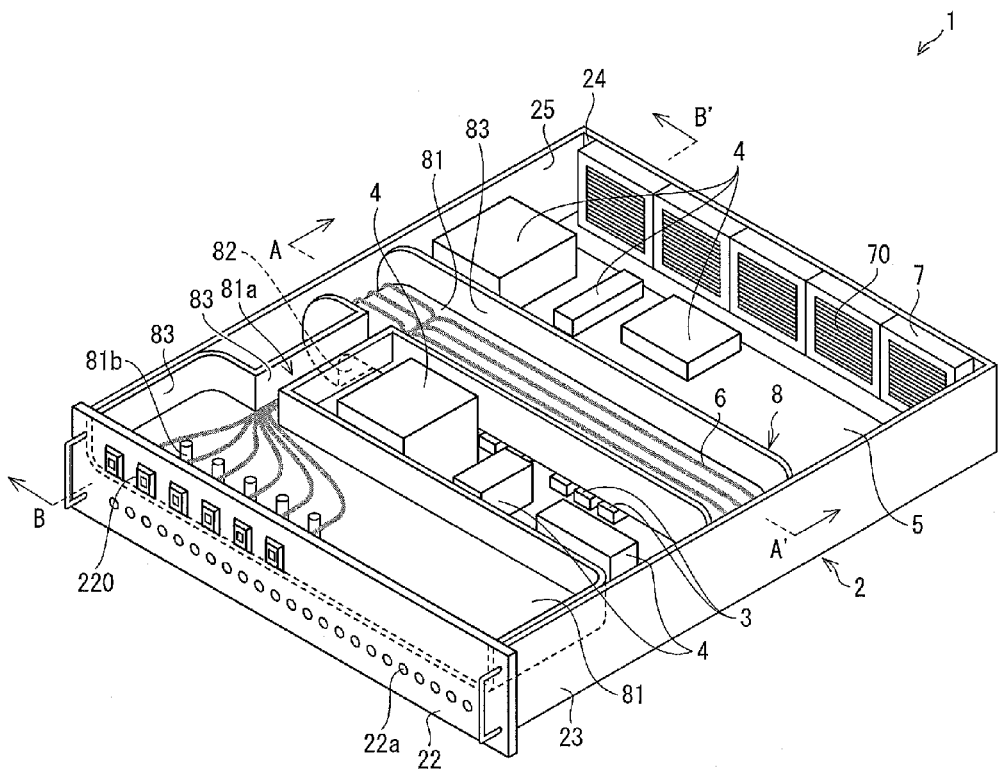
FIG. 1 is a perspective view illustrating a configuration of an apparatus which includes an optical fiber, in accordance with Embodiment 1 of the present invention.
Figure 2:
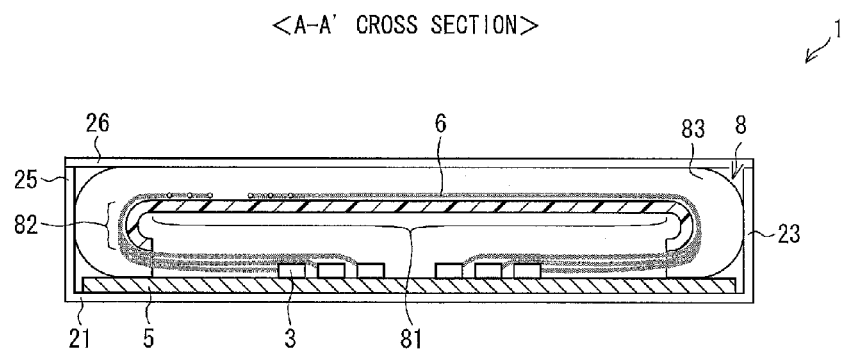
FIG. 2 is a cross-sectional view of the apparatus taken along the line A-A' of FIG. 1.
Figure 3:
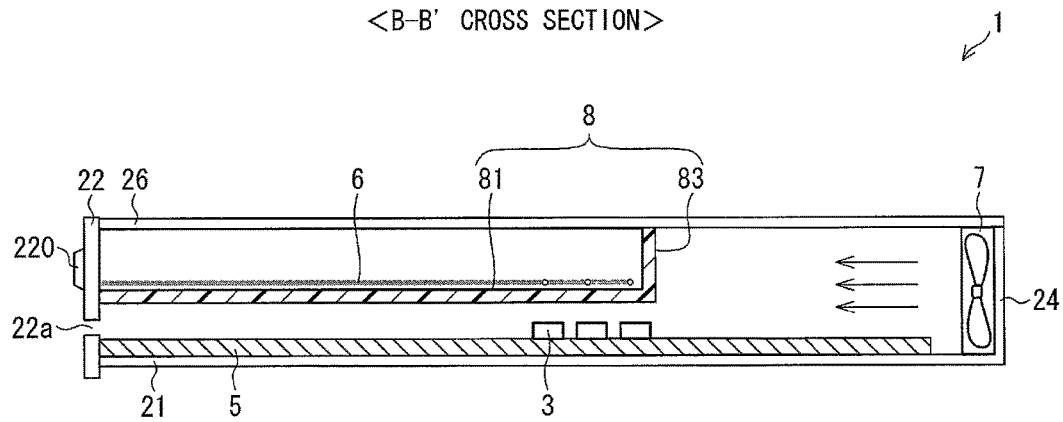
FIG. 3 is a cross-sectional view of the apparatus taken along the line B-B' of FIG. 1.

The following description will discuss, with reference to FIGS. 1 through 3, an apparatus which includes an optical fiber provided in a housing, in accordance with Embodiment 1 of the present invention. According to Embodiment 1, the apparatus is exemplified which includes, in its housing, (i) optical modules each of which transmits/receives an optical signal with the use of an optical fiber and (ii) electronic components each of which processes an electric signal. Note, however, that each of the electronic components is not an essential constituent member.

FIG. 1 is an upper perspective view illustrating the apparatus of Embodiment 1. An apparatus 1 of Embodiment 1 includes a housing 2, a substrate 5 on which optical modules 3 and electronic components 4 are provided, optical fibers 6, cooling fans 7, and an optical fiber arranging member 8 (supporting member). The apparatus 1 of Embodiment 1 can be configured as a node contained in a rack of a supercomputer. The following description will discuss details of the constituent members.

<Housing 2>

The housing 2 is an exterior part of the apparatus 1. The housing 2 has a bottom section 21 (bottom plate), a front section 22 (lateral wall) and side sections 23, 24, and which are provided so as to surround the bottom section 21, and a cover section (not illustrated) which faces the bottom section 21.

An upper surface of the bottom section 21 constitutes a bottom surface of the housing 2, and the substrate 5 is provided on a part of the bottom surface.

The front section 22 (i) is fixed to the side sections 23 and 25 which face each other and (ii) serves as a front panel of the node. The front section 22 has a plurality of ports 220. Each of the plurality of ports 220 is an optical fiber connection port via which the optical fiber 6 provided in the housing 2 is connected with an optical fiber (not illustrated) provided outside of the apparatus 1. The front section 22 has through holes 22a provided between inside and outside of the housing 2 so that wind generated by the cooling fans 7 (later described) passes through an inner space of the housing 2 and is then emitted to the outside via the through holes 22a.

It is preferable that the housing 2 is made of a material which blocks an electromagnetic wave so that (i) an electromagnetic wave generated by the electronic components and the like provided in the housing 2 does not leak to the outside and (ii) an electromagnetic wave which influences the electronic components does not enter the housing 2 from outside.

<Substrate 5 on which Optical Modules 3 and Electronic Components 4 are Provided>

The substrate 5 is provided on the upper surface of the bottom section 21 of the housing 2. The optical modules 3 and the electronic components 4 are provided on an upper surface of the substrate 5 which upper surface faces the inner space of the housing 2.

Each of the optical modules 3 is optically connected with the port 220 of the housing 2 via the optical fiber 6 so as to transmit an optical signal to or receive an optical signal from the port 220 via the optical fiber 6. Each of the optical modules 3 is a module such as an optical element, an optical circuit, or an optical component which carries out a process (operation) in accordance with an optical signal.

Each of the electronic components 4 is configured to process an electric signal, and is a device such as a CPU. According to Embodiment 1, the plurality of electronic components 4 having various sizes are provided on the substrate 5 as illustrated in FIG. 1. Note, however, that the number and a type of the electronic component(s) 4 are not limited in particular. Each of the electronic components 4 can be, for example, provided with a cooling fin (not illustrated) on its upper surface or lateral surface. Each of the electronic components 4 can generate heat during operation, and accordingly an inner part and an outer casing of the electronic component 4 can be heated up. Under the circumstances, a malfunction or a failure is caused by the increase in temperature, and therefore a heat radiating mechanism can be provided in order to avoid such a problem. There are various kinds of heat radiating mechanisms, and a mechanism utilizing heat-conducting property and a cooling fin are known. Each of the electronic components 4 has means for transmitting/receiving an electric signal. However, such means is not an essence of the present invention, and is therefore not described in this specification. Note that each of the optical modules 3 can also be provided with a similar heat radiating mechanism.

The optical modules 3 and the electronic components 4 are spaced on the substrate 5 so that wind generated by the cooling fans 7 (later described) passes through so as to cool down the optical modules 3 and the electronic components 4 while ventilating inside the entire housing 2.

According to Embodiment 1, the optical modules 3 and the electronic components 4 are provided on the single substrate 5. Note, however, that it is possible to separately employ (i) an optical substrate on which the optical modules 3 are provided and (ii) an electronic substrate on which the electronic components 4 are provided.

<Optical Fiber 6>

The optical fiber 6 is made up of a core, cladding surrounding the core, and an outer coating surrounding the cladding. Here, the cladding can be single-layered or multi-layered (that is, the optical fiber 6 can be a so-called single-cladding fiber or a so-called multi-cladding fiber).

Each of the core and the cladding of the optical fiber 6 is preferably made of, for example, glass such as quartz glass (silica glass), and can be made of plastic such as fluorocarbon resin. The outer coating is preferably made of ultraviolet (UV) curable resin such as urethane acrylate, epoxy acrylate, or butadiene acrylate, or resin such as acrylic resin, urethane resin, silicone resin, polyamide resin, or polyimide resin. An outer diameter of the optical fiber 6 (i.e., an outer diameter of the outer coating) is, for example, 0.25 mm, 0.4 mm, 0.5 mm, or 0.9 mm.

In the housing 2, each of the optical fibers 6 is arranged while being supported by the optical fiber arranging member 8 (later described), one end of the optical fiber 6 is connected with a corresponding one of the optical modules 3, and the other end of the optical fiber 6 is connected, from inside of the housing 2, with a corresponding one of the ports 220 provided in the front section 22 of the housing 2.

According to Embodiment 1, the plurality of ports 220 are provided in the front section 22 of the housing 2, and the optical fibers 6 are connected with the respective plurality of ports 220, as illustrated in FIG. 1. Note that the number of the ports 220 and the number of the optical fibers 6 illustrated in FIG. 1 are merely an example, and the present invention is not limited to this. Moreover, it is not necessary that the optical fibers 6 are connected with respective of all the ports 220.

<Cooling Fan 7>

The cooling fans 7 are provided on the side section 24 which faces the front section 22 of the housing 2, and generate wind blowing from feed openings 70 toward the front section 22.

The wind generated by the cooling fans 7 threads between the optical modules 3 and the electronic components 4 in the housing 2 while removing heat from the optical modules 3 and the electronic components 4, and is then emitted to the outside of the apparatus 1 via the through holes 22a provided in the front section 22. This makes it possible to prevent the optical modules 3, the electronic components 4, and the housing 2 from being excessively heated up.

In FIG. 1, five cooling fans 7 are provided. Note, however, that the number of cooling fans 7 is not limited to a particular number. Moreover, a location(s) in which the cooling fans 7 are provided in the inner space of the housing 2 is not limited to the location illustrated in FIG. 1.

According to the present invention, the cooling fans are not necessarily provided inside the housing. For example, the housing can have only a feed opening through which wind blows from outside into the inner space. In this case, it is possible that a cooling fan is provided outside so as to send wind into the inner space via the feed opening. Alternatively, natural wind can be utilized by employing a mechanism in which the natural wind blows into the inner space of the housing via the feed opening.

A velocity of wind generated by the cooling fans 7 toward the inner space of the housing 2 is not limited to a particular one. However, in order to efficiently radiate heat as above described, it is preferable to send relatively strong wind (i.e., high wind velocity).

Under the circumstances, if the optical fibers 6 are arranged in the inner space of the housing 2 while being exposed, the optical fibers 6 flutter by the wind generated by the cooling fans 7, and the optical fibers 6 themselves, a part which makes contact with the fluttering optical fiber 6, and the like may be deformed and deteriorated in property. In view of this, the optical fiber arranging member 8 is provided in Embodiment 1 in order to avoid such problems. The following description will discuss the optical fiber arranging member 8.

<Optical Fiber Arranging Member 8>

The optical fiber arranging member 8 is located at least part of a path connecting the ports 220 and the optical modules 3 and supports and guides the optical fibers 6.

The optical fiber arranging member 8 is provided so as to form a space inside the housing 2 in which space (i) the wind generated by the cooling fans 7 does not blow and (ii) the optical fibers 6 are arranged. In other words, the optical fiber arranging member 8 serves as (i) space separating means for separating the inner space of the housing 2 into a space in which wind generated by the cooling fans 7 does not blow and a space in which the optical modules 3 and the electronic components 4 are provided and the wind of the cooling fans 7 blows and (ii) optical fiber supporting means for supporting the optical fibers so that the optical fibers are arranged in the space in which the wind of the cooling fans 7 does not blow. That is, the space in which the wind of the cooling fans 7 does not blow is a wiring space.

Specifically, the optical fiber arranging member 8 has a first supporting section 81, second supporting sections 82, and shielding walls 83.

The first supporting section 81 guides and supports the optical fibers 6 in parallel with the bottom surface of the housing 2. The first supporting section 81 is located higher than the optical modules 3, that is, located closer to the cover section than the optical modules 3 are.

The first supporting section 81 guides the optical fibers 6, which are arranged in substantially identical directions, while gathering the optical fibers 6. Specifically, the first supporting section 81 has a gathering region 81a for gathering the plurality of optical fibers 6 as illustrated in FIG. 1. The gathering region 81a gathers the plurality of optical fibers 6, which are spaced by guiding sections 81b in the vicinity of the ports 220, in an area in which the optical fibers 6 are guided in a direction away from the ports 220.

By providing the gathering region 81a, it is possible to prevent the plurality of optical fibers 6 from intersecting with each other in a complicated manner in the housing 2, and it is therefore possible to smoothly change the arrangement of the optical fibers 6. According to Embodiment 1, the gathering region 81a is provided in a narrow space between the electronic component 4 and the side section 25 of the housing 2 (see FIG. 1). Note, however, that the present invention is not limited to this, and the gathering region 81a can be provided in a narrow space between an electronic component 4 and another electronic component 4.

In the first supporting section 81, specifically, in a route between the gathering region 81a and the optical modules 3, the plurality of optical fibers 6 which are gathered in the gathering region 81a are loosened and arranged in parallel with a direction in which the ports 220 are aligned. According to Embodiment 1, the gathering region 81a is provided in the vicinity of the side section 25. The plurality of optical fibers 6 are separated into two directions from the gathering region 81a, i.e., separated toward the side section 23 and the side section 25 and guided in parallel with the direction in which the ports 220 are aligned. Note that which ones of the optical fibers 6 are guided to the side section 23 and which ones of the optical fibers 6 are guided to the side section 25 can be determined as appropriate in accordance with locations of optical modules 3 to be connected and a wiring relation.

FIG. 2 is a cross-sectional view of the apparatus 1 taken along the line A-A' of FIG. 1. FIG. 2 illustrates a region in which the optical fibers 6 are supported and arranged in parallel with the direction in which the ports 220 are aligned. As illustrated in FIG. 2, the region of the first supporting section 81, in which region the optical fibers 6 are supported and guided in parallel with the direction in which the ports 220 are aligned, overlaps with the optical modules 3.

The following description will discuss, in detail, a location in which the first supporting section 81 is provided, with reference to FIG. 2.

The first supporting section 81 has a supporting surface which lies in parallel with the bottom surface of the housing 2 (and the upper surface of the substrate 5) as illustrated in FIG. 2. The supporting surface faces the cover section 26 of the housing 2. The optical fibers 6 are partially arranged on the supporting surface. The supporting surface can at least partially make contact with the optical fibers 6.

The supporting surface of the first supporting section 81 lies at a height which is substantially identical with a height at which the ports 220 are aligned. Here, the "height" is defined as a distance from the bottom surface of the housing 2 in a direction perpendicular to the bottom surface of the housing 2 (and the upper surface of the substrate 5) and in a direction from the bottom surface to the cover section 26. Specifically, the ports 220 are provided in the front section 22 at a height which is half of a height from the bottom surface to the cover section 26. Further, the supporting surface of the first supporting section 81 is located at the height, at which the ports 220 are aligned, such that the supporting surface can support each of the optical fibers 6 by making contact with a bottom side part of the optical fiber 6 connected with the port 220 and extends horizontally.

According to the configuration, the optical fibers 6 which extend horizontally from the respective ports 220 are horizontally supported so as not to be excessively bent in the vertical direction. Moreover, it is possible to avoid failure in connection with the ports 220 which may be caused if the optical fibers 6 are excessively bent.

Note that "the supporting surface of the first supporting section 81 is located at the height, at which the ports 220 are aligned" encompasses not only a case where the height of the supporting surface is completely identical with the height of the ports 220 but also a case where the heights are different to the extent of bringing about the above described effect.

The second supporting sections 82 guide and support the optical fibers 6 in a direction perpendicular to the bottom surface of the housing 2. As illustrated in FIG. 2, each of the second supporting sections 82 is provided in a route, in which the optical fibers 6 are arranged, between the first supporting section 81 and the optical modules 3 and has a curved surface which is continuous with the supporting surface of the first supporting section 81. The curved surface eliminates a height difference between the first supporting section 81 and the optical modules 3. According to Embodiment 1, the second supporting sections 82 are provided in the vicinity of the respective side sections 23 and 25 (which are continuous with the front section 22) so that the first supporting section 81, which is located above the optical modules 3, is disposed between the second supporting sections 82 (see FIGS. 1 and 2). The curved surfaces of the second supporting sections 82 are convex toward the respective side sections 23 and 25.

By forming the second supporting sections 82 in the curved surfaces, it is possible to appropriately guide the optical fibers 6 from the first supporting section 81 down to the optical modules 3 without improperly bending or folding the optical fibers 6. A radius of each of the curved surfaces can be set as appropriate in accordance with a type of the optical fiber 6.

The shielding wall 83 is arranged perpendicularly to a direction in which wind of the cooling fans 7 blows. Specifically, the shielding wall 83 is provided on an edge of the first supporting section 81 and the second supporting sections 82, which edge is on a cooling fan 7 side. The shielding wall 83 has a surface which lies in a direction perpendicular to the bottom surface of the housing 2 so as to cover (i) a space between the first supporting section 81 and the cover section 26, (ii) a space between one of the second supporting sections 82 and the side section 23, and (iii) a space between the other of the second supporting sections 82 and the side section 25.

It is preferable that, as illustrated in FIG. 2, the shielding wall 83 is provided so as to completely seal the space between the cover section 26 and the first supporting section 81 that is provided between the side section 23 and the side section 25 which face each other.

FIG. 3 is a cross-sectional view of the apparatus 1 taken along the line B-B' of FIG. 1. The wind of the cooling fans 7 blows from the side section 24, which faces the front section 22, toward the front section 22 along the bottom surface of the housing 2 as indicated by the arrows in FIG. 3. As such, by providing the shielding wall 83 between the supporting surface of the first supporting section 81 (i.e., the optical fibers 6 supported by the supporting surface) and the side section 24, that is, by providing the shielding wall 83 windward as illustrated in FIG. 3, it is possible to bring about an effect of preventing the optical fibers 6, which are supported by the supporting surface, from being exposed to the wind. This also applies to the curved surfaces of the second supporting sections 82 illustrated in FIG. 2. That is, the shielding wall 83 is provided between the side section 24 and the curved surfaces (i.e., the optical fibers 6 supported by the curved surfaces), that is, the shielding wall 83 is provided windward so as to bring about an effect of preventing the optical fibers 6, which are supported by the curved surfaces, from being exposed to the wind.

According to Embodiment 1, another shielding wall 83 is further provided on the leeward side of the optical fibers 6 as illustrated in FIG. 1. For example, a shielding wall 83, which has a surface lying in a direction in which wind blows, is provided on an edge of the gathering region 81a of the first supporting section 81. With the configuration, the shielding wall 83 blocks wind whose direction has been changed by blowing against the optical modules 3, the electronic components 4, and inner surfaces of the housing 2, etc., and it is therefore possible to further effectively prevent the optical fibers 6 from being exposed to the wind.

According to Embodiment 1, a space which is not influenced by the wind of the cooling fans 7 is formed by the first supporting section 81, the second supporting sections 82, the shielding walls 83, the front section 22 of the housing 2, and the cover section 26 (see FIG. 2). That is, the optical fiber arranging member 8 can form, in the housing 2, a wiring space in which the optical fibers 6 can be freely arranged without being influenced by the wind.

Meanwhile, the wind of the cooling fans 7 blows under the optical fiber arranging member 8 while removing heat from the optical modules 3 and the electronic components 4, and is then emitted to the outside of the apparatus 1 via the through holes 22a provided in the front section 22.

The optical fiber arranging member 8 is fixed inside the housing 2 with the use of fixing means (not illustrated). Note that the optical fiber arranging member 8 can be fixed to the optical module 3 or the electronic component 4, instead of the housing 2.

According to the present embodiment, the supporting surface of the first supporting section 81 is level in a part from the vicinity of the ports 220 to the vicinity of the optical modules 3. Note, however, that the present invention is not limited to this, provided that a region of the supporting surface of the first supporting section 81, which region is in the vicinity of the ports 220, is located level with the ports 220. That is, a height of the other region of the supporting surface of the first supporting section 81 can be lower than the ports 220, and can be lower than upper surfaces of the optical modules 3. This is because the essence of the present invention is to provide the apparatus which includes the optical fiber arranging member that serves as the optical fiber supporting means for (i) bringing about freedom in wiring and (ii) securing a wiring space which is not influenced by wind in the housing. In view of this essence, an aspect can be employed in which a wiring space is secured in the housing even though the optical fiber arranging member supports the optical fibers in a location lower than the upper surfaces of the optical modules in the route of the optical fibers from the ports to the optical modules.

Modification Example 1

Figure 4:
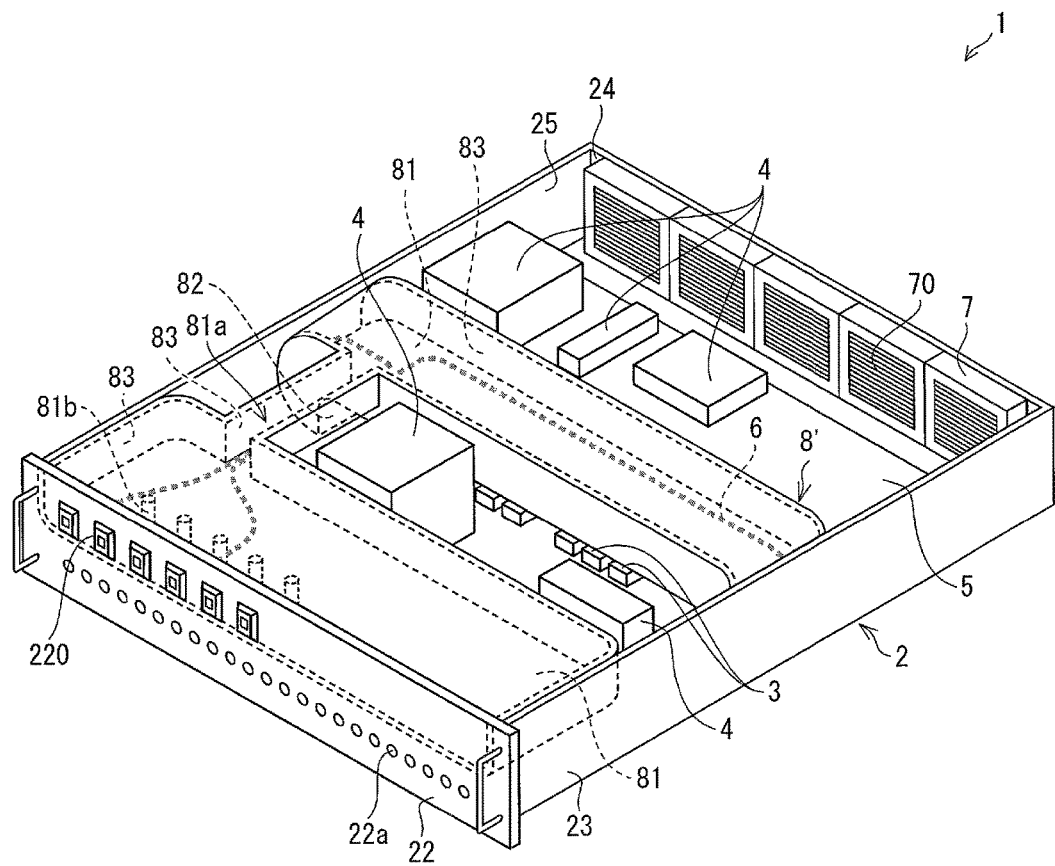
FIG. 4 is a perspective view illustrating a configuration of an apparatus including an optical fiber arranging member, in accordance with a modification example 1 of Embodiment 1 of the present invention.

FIG. 4 illustrates a modification example 1 of Embodiment 1 and corresponds to FIG. 1.

The modification example 1 is mainly different from Embodiment 1 in shape of an optical fiber arranging member 8' and the optical fiber arranging member 8. Specifically, the optical fiber arranging member 8 of Embodiment 1 is entirely formed in a groove shape (see FIG. 1), and the optical fiber arranging member 8' of the modification example 1 is entirely formed in a tubular shape (see FIG. 4). As such, the optical fiber arranging member 8 of Embodiment 1 is different from the optical fiber arranging member 8' of the modification example 1. Note that FIG. 4 illustrates only some of the optical fibers 6.

In a case where the optical fiber arranging member 8' has the tubular structure as in the modification example 1, lateral parts and an upper part of the optical fiber arranging member 8' serve as the shielding walls 83 of Embodiment 1. The optical fibers 6 are inserted and supported in the tubular optical fiber arranging member 8'.

Note that, even in the configuration illustrated in FIG. 4, the cover section 26 is provided as an upper surface section of the housing 2.

Modification Example 2

Figure 5:
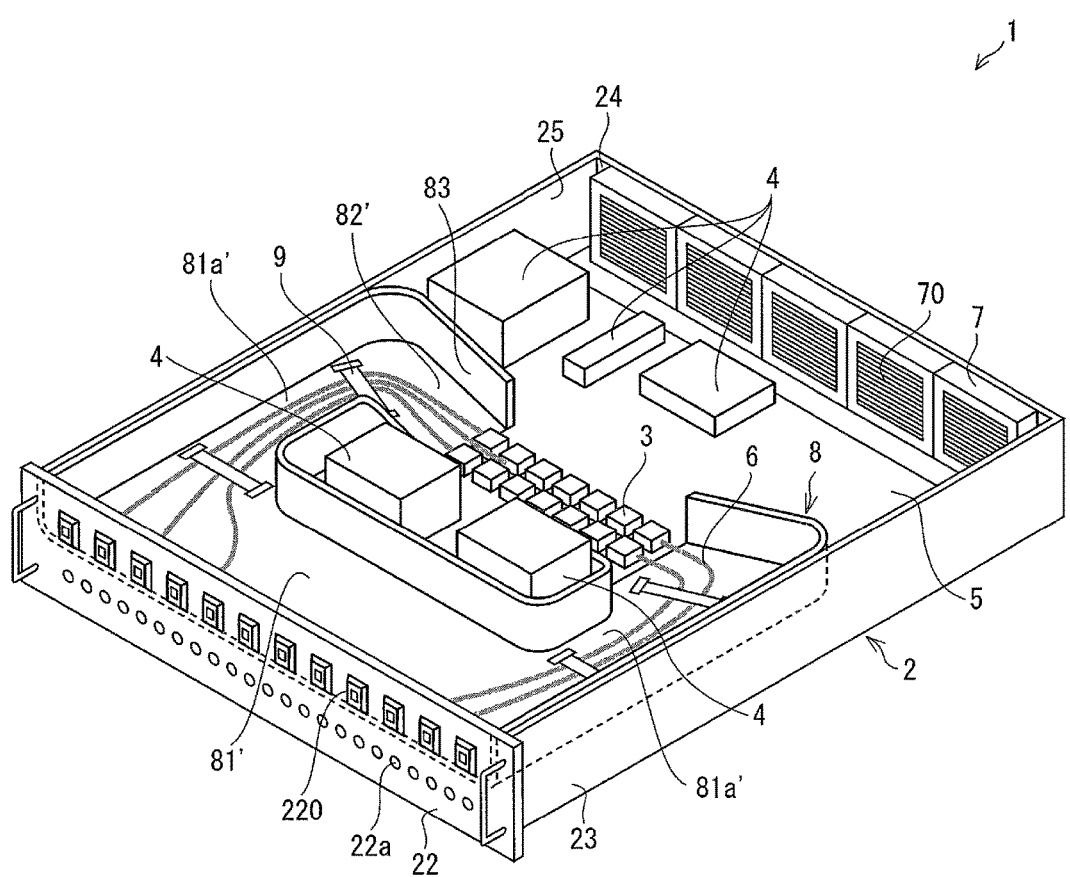
FIG. 5 is a perspective view illustrating a configuration of an apparatus including an optical fiber arranging member, in accordance with a modification example 2 of Embodiment 1 of the present invention.

FIG. 5 illustrates a modification example 2 of Embodiment 1 and corresponds to FIG. 1. Note that FIG. 5 illustrates only some of the optical fibers 6.

The modification example 2 is different from Embodiment 1 (i) in shape of the optical fiber arranging member 8 and (ii) in whether or not optical fiber fixing means is provided.

Specifically, the optical fiber arranging member 8 of Embodiment 1 has the one (1) gathering region 81*a* which is provided between the side section 23 and the side section 25 that face each other (see FIG. 1). Meanwhile, in the modification example 2, gathering regions 81*a*' are provided in the vicinity of the side section 23 and in the vicinity of the side section 25, respectively (see FIG. 5).

The optical fiber arranging member 8 of the modification example 2 has a first supporting section 81', a second supporting section 82', and shielding walls 83.

The first supporting section 81' has a supporting surface on which the optical fibers 6, which are connected with the respective ports 220, are directed to and guided along the side sections 23 and 25 (to which the front section 22 is fixed) in a direction away from the ports 220. The gathering regions 81*a*' are provided in respective regions in which the optical fibers 6 are guided along the side sections 23 and 25 in the direction away from the ports 220.

The second supporting section 82' is provided in a wiring route between the first supporting section 81' and the optical modules 3. The second supporting section 82' has slopes which are continuous with the supporting surface of the first supporting section 81'. The slopes eliminate a height difference between the first supporting section 81' and the optical modules 3.

The shielding walls 83 are provided on the first supporting section 81' and the second supporting section 82' as with Embodiment 1 so as to prevent the optical fibers 6, which are supported and arranged on the supporting surface and the slopes, from being exposed to wind.

Moreover, according to the modification example 2, a plurality of fixing bands 9 (fixing member) are provided in the wiring route for fixing the optical fibers 6 to the supporting surface and the slopes on which the optical fibers 6 are supported and arranged. The fixing bands 9 are detachable and are provided so as to tie a bundle of the optical fibers 6 to the first supporting section 81' and the second supporting section 82'. This prevents the optical fibers 6 from being uplifted from the supporting surface of the first supporting section 81' or the slopes of the second supporting section 82', and it is therefore possible to avoid a case in which the optical fibers 6 are exposed to wind of the cooling fans 7. A concrete example of the fixing band 9 encompasses a bundling band. Note that an aspect of the fixing member is not limited to a band such as the fixing band 9, provided that the above described effect can be brought about.

Note that, even in the configuration illustrated in FIG. 5, the cover section 26 is provided as the upper surface section of the housing 2.

Embodiment 2

The following description will discuss another embodiment of the present invention, with reference to FIGS. 6 through 9. In the present embodiment, differences from Embodiment 1 are described. Therefore, for convenience of explanation, identical reference numerals are given to constituent members having functions identical to those of Embodiment 1, and descriptions of such constituent members are omitted.

Figure 6:
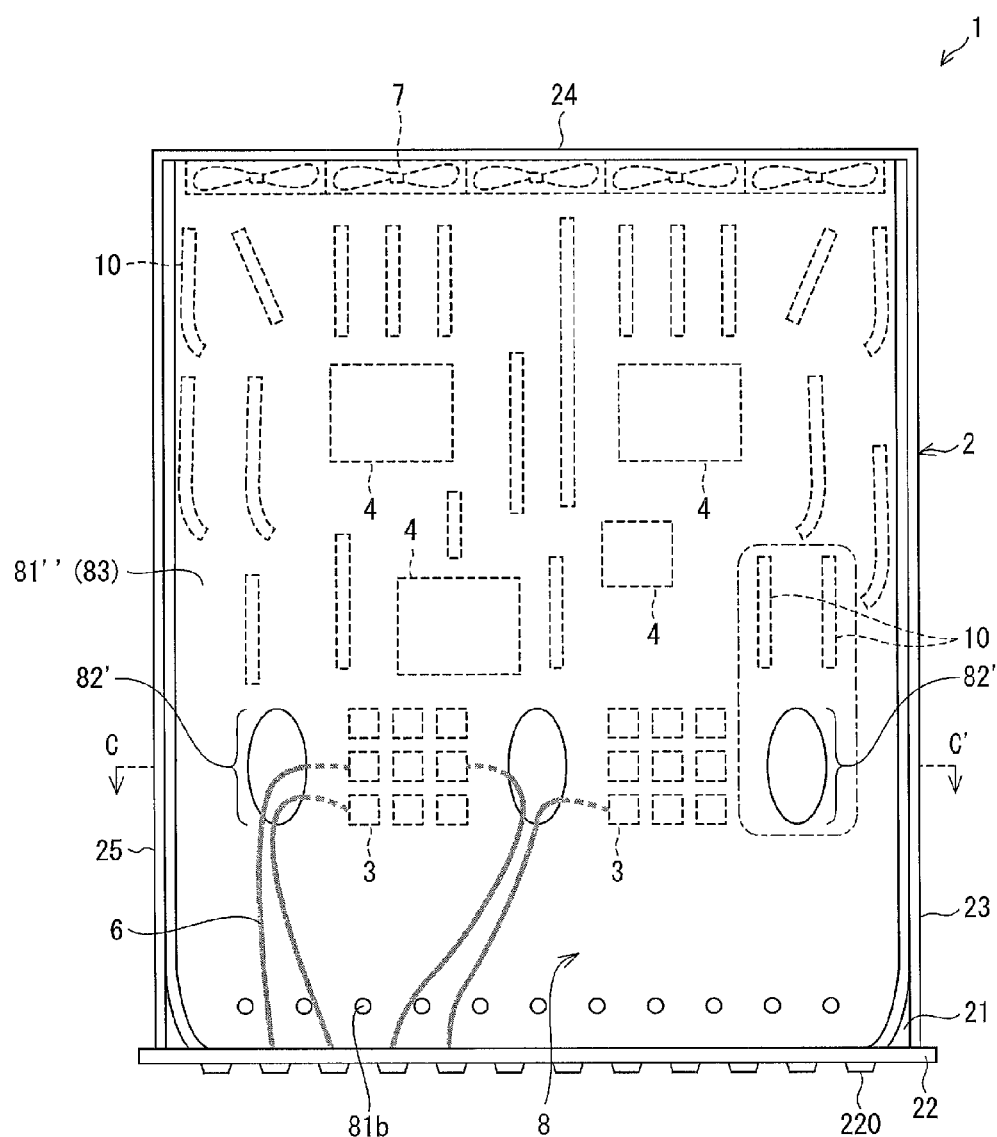
FIG. 6 is a top view illustrating a configuration of an apparatus which includes an optical fiber arranging member, in accordance with Embodiment 2 of the present invention.
Figure 7:
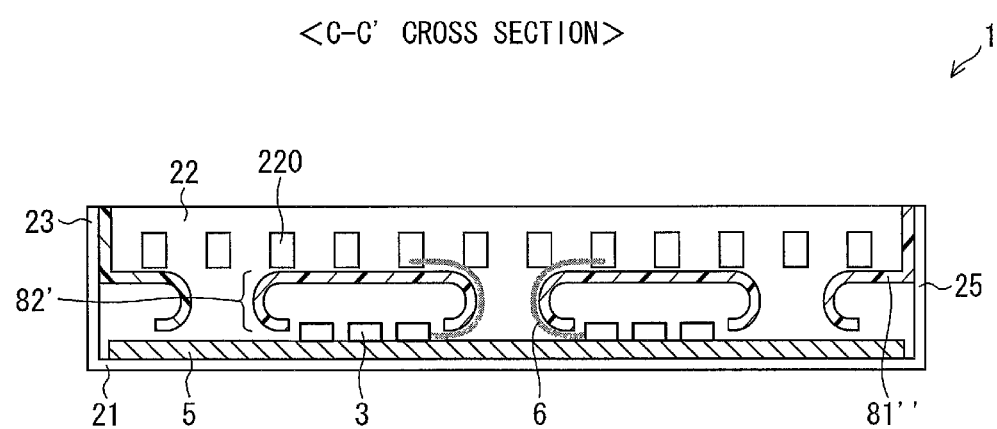
FIG. 7 is a cross-sectional view of the apparatus taken along the line C-C' of FIG. 6.
Figure 8:
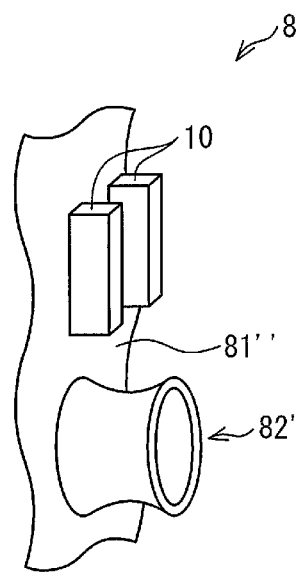
FIG. 8 is a partial perspective view illustrating the optical fiber arranging member provided in the apparatus illustrated in FIG. 6.
Figure 9:
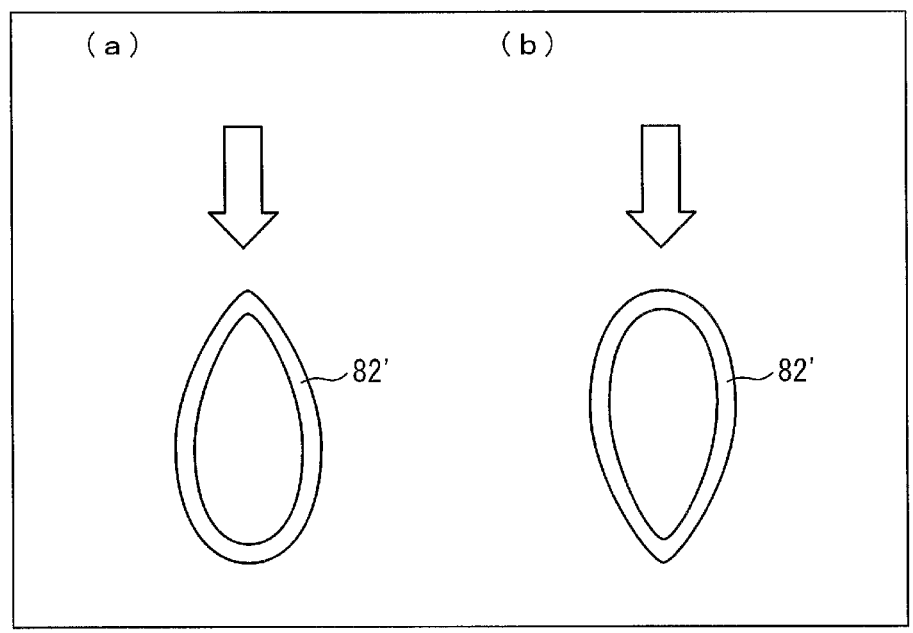
FIG. 9 is a top view partially illustrating a configuration of the optical fiber arranging member provided in the apparatus illustrated in FIG. 6.

FIG. 6 is a top view of an apparatus 1 of Embodiment 2. For convenience of explanation, a cover section of a housing 2 is not illustrated in FIG. 6. FIG. 7 is a cross-sectional view of the apparatus 1 taken along the line C-C' of FIG. 6. For convenience of explanation, FIG. 7 illustrates a front section 22 and ports 220. FIG. 8 is a perspective view of a part of a rear surface of an optical fiber arranging member illustrated in FIG. 6. FIG. 9 is a partial cross-sectional view of the optical fiber arranging member illustrated in FIG. 6.

Embodiment 2 is different from Embodiment 1 (i) in configuration of the optical fiber arranging member 8 and (ii) in whether or not wind guide plates 10 for guiding wind are provided.

Specifically, in the apparatus 1 of Embodiment 2, a first supporting section 81" of the optical fiber arranging member 8 spreads all over the housing 2 as illustrated in FIG. 6. That is, the first supporting section 81" separates an entire inner space of the housing 2 into an upper layer and a lower layer. On a cover section side of the first supporting section 81", the optical fibers 6 connected with the respective ports 220 are guided to a location in the vicinity of optical modules 3 to be connected. Meanwhile, on a bottom section 21 side of the first supporting section 81", cooling fans 7, the optical modules 3, electronic components 4, and a substrate 5 are provided. According to Embodiment 2, the first supporting section 81" itself serves as the shielding walls 83 of Embodiment 1.

According to Embodiment 2, second supporting sections 82' are provided as with Embodiment 1 in order to eliminate a height difference between the first supporting section 81" and the optical modules 3 so that the optical fibers 6 arranged on the first supporting section 81" are guided down via the second supporting sections 82'.

According to Embodiment 2, each of the second supporting sections 82' has a tubular structure which is connected with a hole provided in the first supporting section 81" (see FIGS. 7 and 8). An inner surface of each of the second supporting sections 82', which has the tubular structure, is a curved surface (see FIG. 7) as with the second supporting section 82 of Embodiment 1.

According to the optical fiber arranging member 8 of Embodiment 2, wind guide plates 10 are provided on a surface of the first supporting section 81", which surface faces the substrate 5, so as to protrude toward the substrate 5. The wind guide plates 10 guide wind, which has been generated by the cooling fans 7, in an intended direction. For example, the wind guide plates 10 define paths of wind as illustrated in FIG. 8, and this is effective for causing wind of the cooling fans 7 to be converged onto an object to be cooled.

Note that the second supporting sections 82', each of which has the tubular structure, can be said to also have a wind guiding function. Under the circumstances, each of the second supporting sections 82' can have a tubular structure whose cross section is a streamline shape as illustrated in (a) and (b) of FIG. 9. In (a) and (b) of FIG. 9, it is assumed that wind blows from the cooling fans 7 in a direction indicated by arrows.

Alternatively, instead of the wind guide plates 10 illustrated in FIGS. 6 and 8, plates each having a streamline shape can be provided.

Modification Example of Embodiment 2

Figure 10:
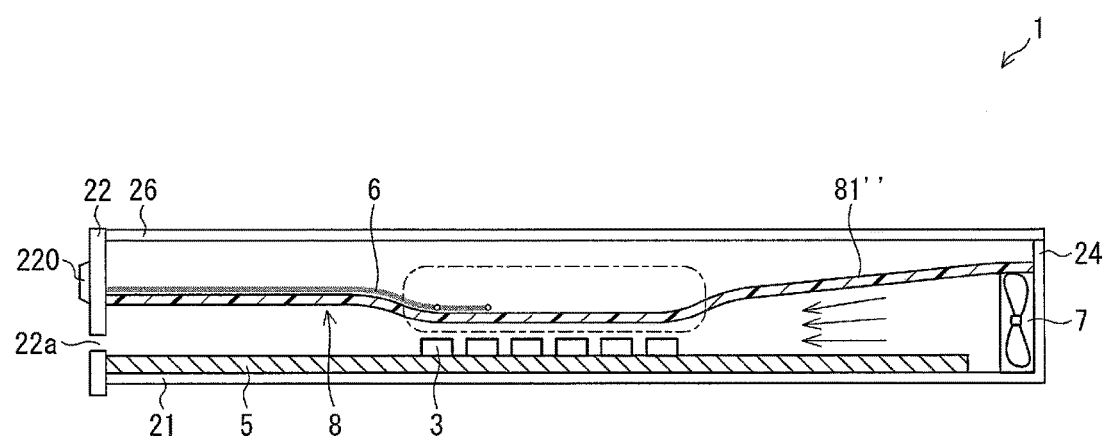
FIG. 10 is a cross-sectional view illustrating an apparatus, in accordance with a modification example of Embodiment 2 of the present invention.

FIG. 10 is a cross-sectional view illustrating a modification example of Embodiment 2.

According to this modification example, a first supporting section 81" of an optical fiber arranging member 8, which is provided above an object to be cooled by wind of the cooling fans 7, is curved to be convex toward the object. That is, a region of the first supporting section 81", which region faces the object, is curved to be convex toward the object.

Specifically, as illustrated in FIG. 10, the first supporting section 81" of the optical fiber arranging member 8, which is located above the optical modules 3, is convex toward the optical modules 3 as indicated by a dotted area in FIG. 10.

By thus configuring the first supporting section 81" to be convex toward the object to be cooled, a velocity of wind generated by the cooling fans 7 is heightened above the object, and it is therefore possible to efficiently cool down the object with a venturi effect.

[Main Points]

In order to attain the object, an apparatus of the present invention includes: a housing having a port to which an optical fiber is to be connected; a substrate on which an optical module is provided in the housing; an optical fiber via which the port is optically connected with the optical module; a feed opening via which wind is introduced into the housing; and a supporting member for supporting the optical fiber in the housing, the supporting member having a shielding wall which is provided windward of the optical fiber so as to block wind blowing toward the optical fiber.

According to the configuration, the shielding wall blocks the wind blowing toward the optical fiber. Therefore, it is unnecessary to support the optical fiber by sandwiching the optical fiber between a sheet material and a laminate material, unlike a conventional configuration. Moreover it is possible to prevent the optical fiber from fluttering by wind and from being deformed by wind pressure.

Therefore, according to the present invention, it is possible to provide the apparatus in which the optical fiber is arranged (i) without being influenced by wind in the housing and (ii) in such a manner as to be easily rearranged.

According to the apparatus in accordance with an embodiment of the present invention, in addition to the configuration, it is preferable that the port is provided in a lateral wall of the housing; and the supporting member has a supporting surface which (i) supports the optical fiber in the vicinity of the port and (ii) is located at a height at which the port is provided, the height being a height from a bottom plate of the housing.

According to the configuration, the supporting surface of the supporting member is provided at the same height as the port in the vicinity of the port. This allows the optical fiber, which extends from the port in the housing, to be supported by the supporting surface without largely changing the height from the bottom plate of the housing. This makes it possible to prevent the optical fiber from improperly bending, and accordingly failure in connection between the port and the optical fiber will not be caused due to improper force.

According to the apparatus in accordance with an embodiment of the present invention, in addition to the configuration, it is preferable that the supporting member has a first supporting section for supporting the optical fiber at a location higher than the optical module; and the supporting member has a second supporting section which is provided between the first supporting section and the optical module and constitutes a curved surface.

According to the configuration, the second supporting section constitutes the curved surface, and this allows the optical fiber to be guided to the optical module while curving along the curved surface. With the configuration, the optical fiber is support in the region between the first supporting section and the optical module without being improperly bent.

According to the apparatus in accordance with an embodiment of the present invention, in addition to the configuration, it is preferable that the supporting member has a tubular structure in which the optical fiber is supported; and the shielding wall is configured by a part of the tubular structure.

According to the configuration, the optical fiber is supported while being arranged through the tubular supporting member, and therefore the optical fiber is arranged in the housing without being influenced by the wind.

According to the apparatus in accordance with an embodiment of the present invention, in addition to the configuration, it is preferable that a wind guide plate for guiding the wind, which has been introduced via the feed opening, in an intended direction is provided on a surface of the first supporting section which surface faces the optical module.

According to the configuration, for example, the wind can be efficiently sent in the housing toward a member whose heat needs to be radiated.

According to the apparatus in accordance with an embodiment of the present invention, in addition to the configuration, the second supporting section can serve as the wind guide plate.

According to the apparatus in accordance with an embodiment of the present invention, in addition to the configuration, it is preferable that a component, whose heat is to be radiated by the wind, is provided on the substrate; the supporting member is provided such that the component is located between the supporting member and the substrate; and the supporting member is convex toward the substrate in a region facing the component.

According to the configuration, a part of the supporting member above the component, whose heat needs to be radiated by wind, is closer to the component so that a path through which wind blows becomes narrower.

This allows an increase in wind velocity above the component, and it is therefore possible to efficiently radiate heat of the component with the venturi effect.

According to the apparatus in accordance with an embodiment of the present invention, in addition to the configuration, it is preferable that the supporting member is further provided with a fixing member for fixing the optical fiber in a detachable manner.

According to the configuration, it is possible to avoid, by providing the fixing member, a case in which the optical fiber is detached from the supporting member.

According to the apparatus in accordance with an embodiment of the present invention, in addition to the configuration, it is preferable that a fan for generating the wind is provided at the feed opening.

The present invention is not limited to the embodiments and the modification examples, but can be altered by a skilled person in the art within the scope of the claims. An embodiment derived from a proper combination of technical means disclosed in respective different embodiments and modification examples is also encompassed in the technical scope of the present invention.

INDUSTRIAL APPLICABILITY

The present invention is applicable to any apparatus having a housing in which an optical fiber is provided.

REFERENCE SIGNS LIST

1: Apparatus
2: Housing
3: Optical module
4: Electronic component
5: Substrate
6: Optical fiber
7: Cooling fan
8, 8': Optical fiber arranging member (supporting member)
9: Fixing band (fixing member)
10: Wind guide plate
21: Bottom section (bottom plate)
22: Front section (lateral wall)
22a: Through hole
23, 24, 25: Side section
26: Cover section
70: Feed opening
81, 81', 81": First supporting section
81a, 81a': Gathering region
81b: Guiding section
82, 82': Second supporting section
83: Shielding wall
220: Port

The invention claimed is:
1. An apparatus comprising:
a housing comprising a port to which an optical fiber is to be connected;
a substrate on which an optical module is provided in the housing;
an optical fiber via which the port is optically connected with the optical module;
a feed opening via which wind is introduced into the housing; and
a supporting member for supporting the optical fiber in the housing,
wherein:
the port is provided in a lateral wall of the housing,
the supporting member comprises a shielding wall which is provided windward of the optical fiber so as to block wind blowing toward the optical fiber,
the supporting member comprises a first supporting section for supporting the optical fiber at a location higher than the optical module, the first supporting section comprising a supporting surface which (i) supports the optical fiber in the vicinity of the port and (ii) is located at a height at which the port is provided, wherein the height is measured from a bottom plate of the housing, and
the supporting member comprising a second supporting section which is provided between the first supporting section and the optical module and constitutes a curved surface.

2. The apparatus as set forth in claim 1, wherein:
the supporting member has a tubular structure in which the optical fiber is supported; and
the shielding wall is configured by a part of the tubular structure.

3. The apparatus as set forth in claim 1, wherein:
a wind guide plate for guiding the wind, which has been introduced via the feed opening, in an intended direction is provided on a bottom surface of the first supporting section which bottom surface faces the optical module.

4. The apparatus as set forth in claim 3, wherein the second supporting section is the wind guide plate.

5. The apparatus as set forth in claim 1, wherein:
a component, whose heat is to be radiated by the wind, is provided on the substrate;
the supporting member is provided such that the component is located between the supporting member and the substrate; and
the supporting member is convex toward the substrate in a region facing the component.

6. The apparatus as set forth in claim 1, wherein:
the supporting member is further provided with a fixing member for fixing the optical fiber in a detachable manner.

7. The apparatus as set forth in claim 1, wherein a fan for generating the wind is provided at the feed opening.

8. A supporting member provided in an apparatus including (i) a housing having a port to which an optical fiber is to be connected and which is provided in a lateral wall of the housing and (ii) a substrate on which an optical module is provided in the housing, said supporting member supporting the optical fiber via which the port is optically connected with the optical module, said supporting member comprising:
a shielding wall which is provided windward of the optical fiber so as to block wind which has been introduced into the housing and blows toward the optical fiber;
a first supporting section for supporting the optical fiber at a location higher than the optical module, the first supporting section comprising a supporting surface which (i) supports the optical fiber in the vicinity of the port and (ii) is located at a height at which the port is provided, wherein the height is measured from a bottom plate of the housing; and
a second supporting section which is provided between the first supporting section and the optical module and constitutes a curved surface.

9. A method for supporting an optical fiber via which a port is optically connected with an optical module in an apparatus including (i) a housing having the port to which the optical fiber is to be connected and which is provided in a lateral wall of the housing and (ii) a substrate on which the optical module is provided in the housing, the method comprising:
supporting the optical fiber with use of a supporting member, the supporting member comprising a shielding wall provided windward of the optical fiber, a first supporting section, and a second supporting section provided between the first supporting section and the optical module and constitutes a curved surface;

blocking wind, which has been introduced into the housing and blows toward the optical fiber, with the shielding wall of the supporting member; and supporting the optical fiber at a location higher than the optical module using the first supporting section, the first supporting section comprising a supporting surface which (i) supports the optical fiber in the vicinity of the port and (ii) is located at a height at which the port is provided, the height being a height from a bottom plate of the housing.

* * * * *